(12) United States Patent
Clark et al.

(10) Patent No.: US 8,066,173 B2
(45) Date of Patent: Nov. 29, 2011

(54) COMPONENT JOINING

(75) Inventors: Daniel Clark, Belper (GB); Stephen Tuppen, Swadlincote (GB)

(73) Assignee: Rolls-Royce PLC, London (GB)

( * ) Notice: Subject to any disclaimer, the term of this patent is extended or adjusted under 35 U.S.C. 154(b) by 0 days.

(21) Appl. No.: 11/907,600

(22) Filed: Oct. 15, 2007

(65) Prior Publication Data

US 2008/0160337 A1    Jul. 3, 2008

(51) Int. Cl.
*B23K 20/12* (2006.01)
*B23K 31/02* (2006.01)

(52) U.S. Cl. .................. 228/112.1; 228/114.5; 228/245

(58) Field of Classification Search ........................ None
See application file for complete search history.

(56) References Cited

U.S. PATENT DOCUMENTS

| | | | | |
|---|---|---|---|---|
| 2,537,533 A * | 1/1951 | Ingalls | ........................ | 29/402.16 |
| 4,367,838 A * | 1/1983 | Yoshida | ........................ | 228/114.5 |
| 4,890,782 A * | 1/1990 | Nakai et al. | ........................ | 228/114.5 |
| 5,064,112 A * | 11/1991 | Isobe et al. | ........................ | 228/112.1 |
| 5,314,106 A * | 5/1994 | Ambroziak et al. | ........................ | 228/114.5 |
| 5,492,264 A * | 2/1996 | Wadleigh | ........................ | 228/112.1 |
| 5,971,252 A * | 10/1999 | Rosen et al. | ........................ | 228/112.1 |
| 5,975,406 A * | 11/1999 | Mahoney et al. | ........................ | 228/112.1 |
| 6,019,272 A * | 2/2000 | Badgley et al. | ........................ | 228/114.5 |
| 6,045,028 A * | 4/2000 | Martin et al. | ........................ | 228/112.1 |
| 6,199,746 B1 * | 3/2001 | Dupree et al. | ........................ | 228/119 |
| 6,213,379 B1 * | 4/2001 | Takeshita et al. | ........................ | 228/112.1 |
| 6,334,571 B1 * | 1/2002 | Shantz et al. | ........................ | 228/256 |
| 6,386,428 B2 * | 5/2002 | Claxton | ........................ | 228/175 |
| 6,454,156 B1 * | 9/2002 | Taras et al. | ........................ | 228/165 |
| 6,880,743 B1 * | 4/2005 | Coletta et al. | ........................ | 228/112.1 |
| 6,889,435 B1 * | 5/2005 | King et al. | ........................ | 29/888.01 |
| 7,021,519 B2 * | 4/2006 | Foster et al. | ........................ | 228/112.1 |
| 7,530,487 B2 * | 5/2009 | Kyriakoglou | ........................ | 228/112.1 |
| 2002/0047037 A1 * | 4/2002 | Shinoda et al. | ........................ | 228/112.1 |
| 2002/0066768 A1 * | 6/2002 | Foster et al. | ........................ | 228/112.1 |
| 2003/0034379 A1 * | 2/2003 | Jackson et al. | ........................ | 228/119 |
| 2003/0038574 A1 | 2/2003 | Fleetwood et al. | | |
| 2003/0042292 A1 * | 3/2003 | Hatten et al. | ........................ | 228/112.1 |
| 2003/0136810 A1 * | 7/2003 | Stevenson et al. | ........................ | 228/112.1 |
| 2003/0141344 A1 * | 7/2003 | Foster et al. | ........................ | 228/114.5 |
| 2003/0192941 A1 * | 10/2003 | Ishida et al. | ........................ | 228/112.1 |
| 2003/0201306 A1 * | 10/2003 | McTernan et al. | ........................ | 228/112.1 |
| 2006/0000875 A1 * | 1/2006 | Kyriakoglou | ........................ | 228/159 |
| 2006/0108394 A1 * | 5/2006 | Okaniwa et al. | ........................ | 228/101 |
| 2007/0119906 A1 * | 5/2007 | Mika | ........................ | 228/112.1 |
| 2007/0119908 A1 * | 5/2007 | Renaud et al. | ........................ | 228/122.1 |
| 2007/0172335 A1 * | 7/2007 | Christ | ........................ | 411/408 |
| 2008/0073412 A1 * | 3/2008 | Weaver | ........................ | 228/119 |
| 2008/0101857 A1 * | 5/2008 | Christ | ........................ | 403/272 |
| 2009/0025795 A1 * | 1/2009 | Wears | ........................ | 137/15.24 |

FOREIGN PATENT DOCUMENTS

| | | | |
|---|---|---|---|
| GB | 722715 A | | 1/1955 |
| GB | 2306365 | * | 5/1997 |
| JP | 01-241375 A | * | 9/1989 |
| JP | 01241375 | * | 9/1989 |
| WO | WO 2004/038062 A2 | | 5/2004 |
| WO | WO 2006/102047 A1 | | 9/2006 |

* cited by examiner

*Primary Examiner* — Kiley Stoner
(74) *Attorney, Agent, or Firm* — Oliff & Berridge, PLC

(57) ABSTRACT

A method for joining first and second components, using brazing material to enable the formation of a brazed joint by heating the brazing material when the first and second components are in a juxtaposed position, comprises bringing the first and second components into a juxtaposed position so that the brazing material is in contact with the first and second components and plastically deforming the brazing material to interlock the first and second components.

18 Claims, 1 Drawing Sheet

COMPONENT JOINING

FIELD OF THE INVENTION

The present invention relates to component joining, and in particular to a method for joining first and second components.

DESCRIPTION OF RELATED ART

Brazing is a known method for joining metallic components. In brazing, brazing material in the form of a low melting point alloy is applied to the surfaces of one or both of the metallic components to be joined, or as an intermediary layer. The metallic components are brought into a juxtaposed position, following which the brazing alloy is heated in order to melt it and thereby create a brazed joint between the metallic components. Low melting point alloys, such as alloys containing copper or nickel, are typically used so that the metallic components themselves are not excessively heated during the step of melting the brazing material.

SUMMARY OF THE INVENTION

In order to form an effective brazed joint between metallic components, it may be necessary to securely hold the components in a suitable juxtaposed position prior to and during heating of the brazing material to form the brazed joint. This can be difficult where the metallic components being joined have complex geometries.

According to a first aspect of the present invention, there is provided a method for joining first and second components using brazing material to enable the formation of a brazed joint by heating the brazing material when the first and second components are in a juxtaposed position, wherein the method comprises bringing the first and second components into a juxtaposed position so that the brazing material is in contact with the first and second components and plastically deforming the brazing material to interlock the first and second components.

The step of plastically deforming the brazing material may comprise causing relative movement between the first and second components.

The step of causing relative movement may comprise rotating the first and second components relative to each other.

The step of causing relative movement may comprise rotating one of the first and second components whilst maintaining the other of the first and second components stationary.

The step of plastically deforming the brazing material may comprise swaging the first and second components.

The method may comprise heating the brazing material prior to said step of plastically deforming the brazing material. Alternatively or additionally, the method may comprise heating the brazing material during said step of plastically deforming the brazing material.

At least one of the first and second components may include brazing material on a contact surface thereof. Both of the first and second components may include brazing material on a respective contact surface thereof. In this case, the method may comprise bringing the first and second components into a juxtaposed position such that the brazing material on the contact surface of the first component is in contact with the brazing material on the contact surface of the second component.

The method may alternatively comprise disposing brazing material between the first and second components, and possibly between their respective contact surfaces, prior to bringing the first and second components into the juxtaposed position. The brazing material could, for example, be a suitably prefabricated interlayer of consumable brazing material, for example in the form of a pressed cone.

The method may comprise applying brazing material to the surface of the first and/or second components prior to plastically deforming the brazing material.

The method may comprise, after said step of plastically deforming the brazing material, heating the brazing material of the interlocked first and second components to form a brazed joint between the first and second components.

The first component may be generally cylindrical and may be locatable in a generally circular aperture in the second component when the first and second components are brought into the juxtaposed position.

One end of the generally cylindrical first component and the generally circular aperture may be correspondingly shaped to provide a tapered fit between the first and second components when brought into the juxtaposed position.

The method may comprise heating the generally cylindrical first component prior to location in the generally circular aperture in the second component. The method may comprise cooling the second component after location of the generally cylindrical first component, heated or unheated, in the generally circular aperture in the second component. This may result in the formation of a shrink fit around the generally cylindrical first component.

According to a second aspect of the present invention, there is provided a joined component formed in accordance with the method of any of the preceding paragraphs.

BRIEF DESCRIPTION OF THE DRAWINGS

An embodiment of the present invention will now be described by way of example only and with reference to the accompanying drawings, in which:—

DETAILED DESCRIPTION OF THE INVENTION

Figure 1:
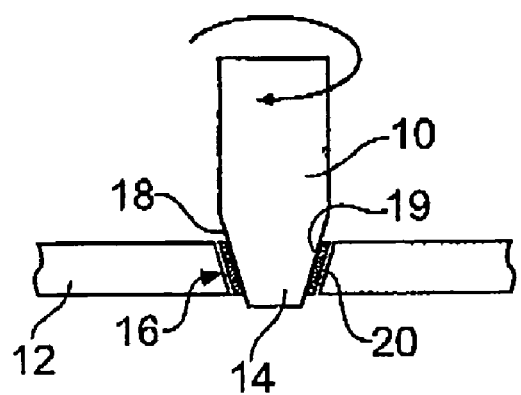
FIG. 1 is a diagrammatic cross-sectional side view of first and second components to be joined together in accordance with the method of the present invention.
Figure 2:
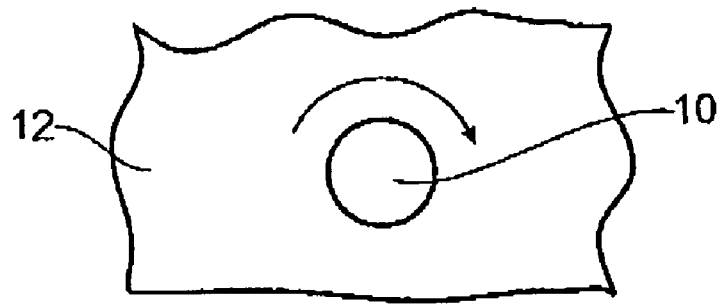
FIG. 2 is a diagrammatic plan view of the first and second components of FIG. 1.
Figure 3:
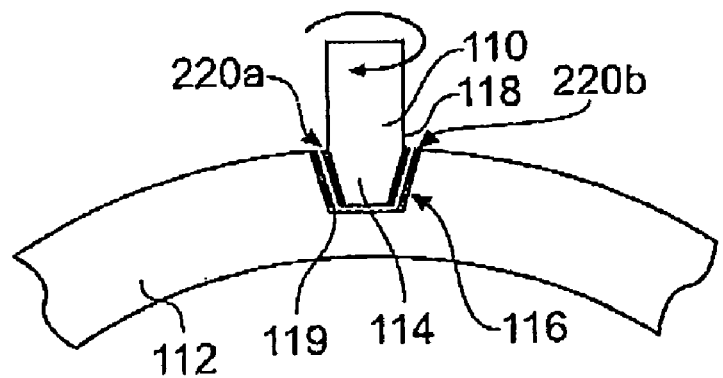
FIG. 3 is a diagrammatic view, similar to FIG. 1, of modified first and second components.

FIGS. 1 and 2 show diagrammatically first and second components 10, 12 which are to be joined together using the method according to the present invention. The first component 10 is generally cylindrical and may, for example, be a stud, a dowel, a pin, or a tube or pipe of relatively small diameter. It is envisaged that cylindrical components having a diameter up to 10 cm can be used with the method of the invention. In the embodiment illustrated in FIG. 1, the second component 12 is in the form of a generally planar sheet. The second component 12 may, however, have alternative configurations and may, for example, be curved, as shown in FIG. 3. In particular, the second component 12 may be the casing of a gas turbine engine component, for example the turbine casing or the combustor casing.

The first component 10 includes a tapered end 14 and the second component 12 includes a generally circular tapered aperture 16 in which the tapered end 14 of the first component 10 is locatable. The tapered aperture 16 may be formed in the second component 12 by a suitable forming technique, such as machining. The tapered aperture 16 is formed so that the taper angle corresponds substantially to the taper angle of the tapered end 14 of the first component 10.

In the embodiment shown, the taper angle is about 20 degrees, measured from the axial direction of the first component. It is envisaged that taper angles between about 5 degrees and about 35 degrees could be used, and the best results will be obtained with a taper angle between about 10 degrees and about 30 degrees.

The first component 10 includes on its contact surface 18, at the tapered end 14, brazing material 20. A circumferentially extending layer of the brazing material 20, typically an alloy containing copper or nickel, is applied to the contact surface 18 of the first component 10 using any suitable technique. Suitable techniques include electroplating or the application of a foil fabricated from the brazing material 20. Typically, the thickness of the layer of brazing material 20 is in the order of 5 to 10·m.

In accordance with embodiments of the invention, the tapered end 14 of the first component 10 is introduced into the tapered aperture 16 in the second component 12 to thereby bring the first and second components 10, 12, and in particular their respective contact surfaces 18, 19, into a juxtaposed position with the brazing material 20 of the first component 10 in contact with the second component 12. A slight gap between the brazing material 20 and the second component 12 is shown in FIG. 1. This is for illustration so that the various features can be clearly illustrated. In practice, there will be a minimal gap when the first and second components 10, 12 are in the juxtaposed position. Indeed, careful control over this gap to ensure that it remains stable during subsequent heating to form a brazed joint is essential. A gap size in the order of less than 0.05 mm is thought to be needed for the present method to work effectively.

In embodiments of the invention, it may be desirable to heat the first component 10 prior to locating the tapered end 14 in the aperture 16 in the second component 12. It may also be desirable to cool the second component 12 after location of the tapered end 14 of the first component 10, whether this is heated or unheated, in the aperture 16 in the second component 12. This cooling may enable the formation of a shrink fit around the tapered end 14 of the first component 10.

In accordance with the invention, the brazing material 20 is plastically deformed to interlock the first and second components 10, 12. The brazing material 20 is plastically deformed by rotating the first component 10 relative to the second component 12, which remains stationary, whilst the first and second components 10, 12 are maintained in the juxtaposed position with the tapered end 14 of the first component 10 located in the tapered aperture 16 in the second component 12. Suitable fixtures and positioning tooling (not shown) are used to precisely locate the first and second components 10, 12 in the juxtaposed position, with the tapered end 14 of the first component 10 in the tapered aperture 16 in the second component 12, and to control the gap size prior to rotating the first component 10 relative to the second component 12. The insertion force is also typically carefully controlled to optimise the plastic deformation of the brazing material 20 during relative rotation between the first and second components 10, 12. It is envisaged that the thickness of the second component 12 will not be less than 2 mm to ensure that it can be adequately supported under the action of the insertion force acting on the first component 10.

The method according to the invention relies on the innate malleability of the brazing material 20, with the shear action caused by relative rotation between the first and second components 10, 12 resulting in cold flow of the surface asperities of the brazing material 20. This technique of swaging the first and second components 10, 12 together forms a secure, mechanical, interlock between the first and second components 10, 12 providing the advantage that there is no need to use positioning tooling to hold the first and second components 10, 12 together during subsequent heating of the brazing material 20 to form a brazed joint between the first and second components 10, 12.

Plastic deformation by a rotational shear action ensures more robust mechanical keying than with prior art methods. The mechanical keying is sufficient that the assembly can be handled even before any heat has been applied to braze the components together. The rotational shear also results in more uniform deformation of the brazing material, which maintains a uniform thickness, and should therefore lead to a more consistent and controllable process.

The tapering of the end 14 of the first component 10 and of the aperture 16 of the second component 12 ensures that the first and second components 10, 12 can be precisely located, relative to each other, in the juxtaposed position and ensures good contact between the contact surfaces 18, 19 of the respective components 10, 12. This may permit a substantially interference fit between the first and second components 10, 12 when brought together into the juxtaposed position. Accordingly, when the first and second components 10, 12 are in the juxtaposed position, the brazing material 20 on the contact surface 18 of the tapered end 14 of the first component 10 is in intimate contact with the tapered circumferential contact surface 19 of the aperture 16 in the second component 12 and, as discussed above, this intimate contact is maintained during the relative rotation.

In order to achieve the necessary plastic deformation of the layer of brazing material 20 to mechanically interlock the first and second components 10, 12, rotation of the first component at high speed for a short period of time is desirable. For example, rotation of the first component 10 at a speed in the order of between 150 and 1000 rev/min for a period in the order of two seconds may provide the level of plastic deformation of the brazing material 20 that is required to secure the first and second components 10, 12 together. However, it will be appreciated by those skilled in the art that rotation at any suitable speed for any suitable period of time may be used to provide the required level of plastic deformation.

Typically, the plastic deformation of the brazing material 20 is carried out at room temperature. The layer of brazing material 20 may, however, be heated prior to, or during, relative rotation of the first and second components 10, 12 to facilitate cold flow of the brazing material 20 and, hence, to facilitate plastic deformation. Such heating may be to a temperature below the melting temperature of the brazing material 20 to prevent the formation of a brazed joint at this stage. Ultimately, it is likely to prove necessary to optimise various parameters, including temperature, feed rate, diameter of the first and second components 10, 12, as well as rotational speed, to create optimum plastic deformation by galling.

Following plastic deformation of the layer of brazing material 20 to form the mechanical interlock between the first and second components 10, 12, at least the plastically deformed brazing material 20 is heated to form a brazed joint between the first and second components 10, 12.

In embodiments of the invention, where the plastically deformed brazing material 20 is a nickel alloy, it may initially be heated to a temperature of about 1200 K, at a heating rate in the order of 90 K/s. This heating may be achieved by an induction heating technique, and an induction coil configured to match the geometry of the joint to be heated may be employed for this purpose.

In embodiments of the invention where the first component 10 is cooled prior to location of the tapered end 14 in the aperture 16 in the second component 12, heating may be rapid and may be targeted in the centre of the generally cylindrical first component 10, and may thus be provided by a laser, electron beam, infrared diode, RF coil, infra-red lamp, or similar device. This will enable heating of the brazing material 20 to form a brazed joint whilst minimising diffusion of the heat at a rate which might otherwise widen the tolerance of the brazing gap between the first and second components 10, 12.

The first and second components 10, 12 may be subsequently heat treated to cause diffusion of the brazing material 20 into the bulk of the material of the first and second components 10, 12 such that the local elemental concentration closely approaches the trace (background) concentration. This is highly advantageous as it results in improved joint quality.

For example, the heat treatment operation, carried out after the brazing operation, may comprise heating the first and second joined components 10, 12 in a furnace to a temperature of approximately 1000 K, holding the joined components 10, 12 at this temperature for approximately 8 hours, decreasing the temperature to approximately 900 K, holding the joined components 10, 12 at this temperature for approximately 8 hours and thereafter decreasing the temperature to room temperature before removing the joined components 10, 12 from the furnace. It may be possible to link or combine this heat treatment operation with the heating of the brazing material 20 to form the brazed joint, thus simplifying the joining process.

Since the first and second components 10, 12 will have been mechanically joined as a result of the plastic deformation of the layer of brazing material 20, the use of positioning tooling during heat treatment to hold the first and second components 10, 12 in the desired juxtaposed position is obviated.

FIG. 3 is a diagrammatic side view of first and second components 110, 112 which are also to be joined together using the method of the present invention. FIG. 3 shares many features in common with FIG. 1, and corresponding features are designated using corresponding reference numerals, prefixed by the number '1'.

In FIG. 3, which shows the first and second components 110, 112 in the juxtaposed position prior to relative rotation therebetween, it will be seen that both the contact surface 118 of tapered end 114 of the first component 110 and the inner circumferential contact surface 119 of the tapered aperture 116 in the second component 112 have respective circumferential layers of brazing material 220a, 220b thereon. Thus, when the first and second components 110, 112 are brought into the juxtaposed position, as shown in FIG. 3, the layers of brazing material 220a, 220b on the respective contact surfaces 118, 119 of the first and second components 110, 112 are in contact with each other. Again, a slight gap is shown in FIG. 3 between the respective layers of brazing material 220a, 220b. As above, this is for illustration purposes only so that the separate layers can be clearly illustrated.

The use of layers of brazing material 220a, 220b on both the first and second components 110, 112 may result in the formation of an enhanced interlock between the first and second components 110, 112 as a result of plastic deformation of both of the layers of brazing material 220a, 220b.

Other differences that will also be noted from FIG. 3, and that are within the scope of the present invention, are that the second component 112 is not planar and that the tapered aperture 116 in the second component 112 is in the form of a blind hole that does not extend fully through the second component 112 but instead only partially through its thickness.

There is thus described a method for joining first and second components which offers significant advantages over prior joining methods because it allows the formation of a secure, mechanical, interlock between the components, prior to forming a brazed joint, by plastically deforming the brazing material. The joining operation is thus simplified and complex tooling, normally required to hold components being joined in a juxtaposed position during brazing, is not required.

Although embodiments of the invention have been described in the preceding paragraphs with reference to various examples, it should be appreciated that various modifications to the examples given may be made without departing from the scope of the present invention, as claimed.

For example, the end 14, 114 of the first component 10, 110 and the aperture 16, 116 in the second component 12, 112 may not be tapered. In this case, the outer diameters of the portion of the first component 10, 110 to be brought into a juxtaposed position with the second component 12, 112, and the aperture 16, 116 in the second component, would need to be of substantially the same diameter so that an interference fit could be established between the first and second components 10, 110, 12, 112. Any form of relative movement, other than rotation, between the first and second components 10, 110, 12, 112 may be employed to plastically deform the brazing material 20, 220a, 220b.

Instead of the brazing material 20 being provided on the contact surface 18 of the first component 10, it may be in the form of an interlayer locatable between the respective contact surfaces 18, 19 of the first and second components 10, 12.

The invention claimed is:

1. A method for joining a first component and a second component by brazing, the method comprising:
bringing a first unthreaded portion of the first component and a second unthreaded portion of the second component into a juxtaposed position with brazing material therebetween, such that the brazing material is in contact with the first unthreaded portion and the second unthreaded portion, and the first component is located in an aperture of the second component when the first unthreaded portion and the second unthreaded portion are brought into the juxtaposed position;
causing relative rotation between the first component and the second component to plastically deform the brazing material by rotational shear action and interlock the first unthreaded portion and the second unthreaded portion, wherein the relative rotation consists of a plurality of complete revolutions of the first component relative to the second component to cause substantially uniform plastic deformation of the brazing material; and
heating the brazing material, after the plastic deformation of the brazing material and using a heating apparatus, to form a brazed joint between the first component and the second component.

2. A method according to claim 1, wherein the causing relative movement between the first component and the second component comprises rotating one of the first and second components whilst maintaining the other of the first and second components stationary.

3. A method according to claim 1, wherein the plastically deforming the brazing material comprises swaging the first and second components.

4. A method according to claim 1, further comprising heating the brazing material prior to bringing the first unthreaded portion and the second unthreaded portion into the juxtaposed position.

5. A method according to claim 1, further comprising heating the brazing material whilst plastically deforming the brazing material.

6. A method according to claim 1, further comprising applying the brazing material to a surface of at least one of the first component and the second component.

7. A method according to claim 6, wherein the brazing material is applied to a surface of the first unthreaded portion and a surface of the second unthreaded portion.

8. A method according to claim 7, wherein the bringing the first unthreaded portion and the second unthreaded portion into the juxtaposed position is such that the brazing material on the surface of the first component is in contact with the brazing material on the surface of the second component.

9. A method according to claim 7, wherein the brazing material is applied to the surface of at least one of the first unthreaded portion and the second unthreaded portion prior to bringing the first unthreaded portion and the second unthreaded portion into the juxtaposed position.

10. A method according to claim 1, the method further comprising disposing an interlayer of brazing material between the first unthreaded portion and the second unthreaded portion prior to bringing the first unthreaded portion and second unthreaded portion into the juxtaposed position.

11. A method according to claim 1, wherein the first component is generally cylindrical and the aperture of the second component is generally circular.

12. A method according to claim 11, wherein one end of the generally cylindrical first component and the generally circular aperture are correspondingly shaped to provide a tapered fit between the first unthreaded portion and the second unthreaded portion when brought into the juxtaposed position.

13. A method according to claim 12, wherein the angle of the corresponding tapers on the end of the first component and the aperture is between 5 degrees and 35 degrees.

14. A method according to claim 11, further comprising heating the generally cylindrical first component prior to being located in the generally circular aperture in the second component.

15. A method according to claim 11, further comprising cooling the second component after locating the generally cylindrical first component in the generally circular aperture in the second component.

16. A method for joining a first component and a second component by brazing, the method comprising:
heating brazing material;
bringing the first component and the second component into a juxtaposed position with the heated brazing material therebetween, wherein the first component is located in an aperture of the second component;
plastically deforming the brazing material, by causing relative rotation between the first component and the second component, in order to interlock the first component and the second component by rotational shear action, wherein the relative rotation consists of a plurality of complete revolutions of the first component relative to the second component to cause substantially uniform plastic deformation of the brazing material; and
further heating the brazing material, after the plastic deformation of the brazing material and using a heating apparatus, to form a brazed joint between the first component and the second component.

17. A method according to claim 16, wherein the brazing material is heated to a temperature that is below its-melting temperature of the brazing material prior to relative rotation of the first component and the second component.

18. A method as claimed in claim 1, wherein the relative rotation consists of between five and approximately thirty three complete revolutions of the first component relative to the second component.

* * * * *

UNITED STATES PATENT AND TRADEMARK OFFICE
CERTIFICATE OF CORRECTION

PATENT NO.      : 8,066,173 B2                       Page 1 of 1
APPLICATION NO. : 11/907600
DATED           : November 29, 2011
INVENTOR(S)     : Clark et al.

It is certified that error appears in the above-identified patent and that said Letters Patent is hereby corrected as shown below:

Title Page

Please add the Foreign Application Priority Data as shown below:

Item (30)  Foreign Application Priority Data

October 17, 2006 (GB)........................ 0620547.0

Signed and Sealed this
Sixth Day of March, 2012

David J. Kappos
*Director of the United States Patent and Trademark Office*